(12) United States Patent
DeLeeuw et al.

(10) Patent No.: US 7,343,874 B2
(45) Date of Patent: Mar. 18, 2008

(54) SILICA GEL BASED ANIMAL LITTER

(75) Inventors: David DeLeeuw, Pleasanton, CA (US); Roger V. Lee, Fremont, CA (US); Charles F. Fritter, Dublin, CA (US); Dennis B. Jenkins, Brentwood, CA (US); Ananth N. Shenoy, San Ramon, CA (US); Ramesh Hernlem, Martinez, CA (US)

(73) Assignee: The Clorox Company, Oakland, CA (US)

( * ) Notice: Subject to any disclaimer, the term of this patent is extended or adjusted under 35 U.S.C. 154(b) by 797 days.

(21) Appl. No.: 10/215,174

(22) Filed: Aug. 7, 2002
(Under 37 CFR 1.47)

(65) Prior Publication Data

US 2004/0025798 A1    Feb. 12, 2004

(51) Int. Cl.
   *A01K 29/00* (2006.01)
(52) U.S. Cl. ................................................. 119/171
(58) Field of Classification Search .................. 119/171, 119/172, 173
   See application file for complete search history.

(56) References Cited

U.S. PATENT DOCUMENTS

| 3,892,846 A | 7/1975 | Wortham ..................... 424/76 |
| 3,921,581 A | 11/1975 | Brewer ......................... 119/1 |
| 3,923,005 A | 12/1975 | Fry et al. ...................... 119/1 |
| 3,993,584 A | 11/1976 | Owen et al. ................. 252/383 |
| 4,085,704 A | 4/1978 | Frazier .......................... 119/1 |
| 4,275,684 A | 6/1981 | Kramer et al. ................ 119/1 |
| 4,306,516 A | 12/1981 | Currey .......................... 119/1 |
| 4,364,925 A * | 12/1982 | Fisher ......................... 424/50 |
| 4,494,482 A * | 1/1985 | Arnold ....................... 119/173 |
| 4,517,919 A * | 5/1985 | Benjamin et al. ........... 119/173 |
| 4,591,581 A * | 5/1986 | Crampton et al. .......... 502/407 |
| 4,685,420 A * | 8/1987 | Stuart ........................ 119/173 |
| 4,795,482 A | 1/1989 | Gioffre et al. ................ 55/75 |
| 4,949,672 A | 8/1990 | Ratcliff et al. ................ 119/1 |
| 5,005,520 A | 4/1991 | Michael ..................... 119/172 |
| 5,018,482 A * | 5/1991 | Stanislowski et al. ...... 119/173 |
| 5,094,190 A | 3/1992 | Ratcliff et al. ............. 119/173 |
| RE33,983 E | 7/1992 | Hughes ...................... 119/173 |
| 5,129,365 A | 7/1992 | Hughes ...................... 119/173 |
| 5,176,107 A | 1/1993 | Buschur ..................... 119/173 |
| 5,183,010 A | 2/1993 | Raymond et al. ........... 119/172 |
| 5,193,489 A | 3/1993 | Hardin ....................... 119/173 |
| 5,207,830 A * | 5/1993 | Cowan et al. .............. 106/672 |
| 5,267,531 A | 12/1993 | Appel et al. ................ 119/171 |
| 5,317,990 A | 6/1994 | Hughes ...................... 119/173 |
| 5,359,961 A | 11/1994 | Goss et al. ................. 119/173 |

(Continued)

FOREIGN PATENT DOCUMENTS

EP    744125 B1    11/1996

(Continued)

*Primary Examiner*—Son T. Nguyen
(74) *Attorney, Agent, or Firm*—Ann Lee; Joel J. Hayashida

(57) ABSTRACT

A litter composition comprising a substantially particulate primary absorbent material and a binding agent, the binding agent comprising approximately 0.01%-40% of the litter composition. In one embodiment, the primary absorbent material comprises silica gel and the binding agent comprises a galactomannan. In additional embodiments, the litter composition also includes at least one of the following components: fixing agent, colorant agent, anti-bacterial agent, fragrance and/or supplemental absorbent material.

58 Claims, 2 Drawing Sheets

U.S. PATENT DOCUMENTS

| | | | |
|---|---|---|---|
| 5,386,803 A | 2/1995 | Hughes | 119/173 |
| 5,503,111 A | 4/1996 | Hughes | 119/173 |
| 5,507,250 A * | 4/1996 | Reddy et al. | 119/173 |
| 5,526,771 A * | 6/1996 | Ito | 119/172 |
| 5,634,431 A | 6/1997 | Reddy et al. | 119/173 |
| 5,826,543 A | 10/1998 | Raymond et al. | 119/173 |
| 5,860,391 A | 1/1999 | Maxwell et al. | 119/173 |
| 5,901,661 A * | 5/1999 | Pattengill et al. | 119/173 |
| 5,970,915 A | 10/1999 | Schlueter et al. | 119/171 |
| 6,207,143 B1 | 3/2001 | Lezdey et al. | 424/76.6 |
| 6,253,710 B1 | 7/2001 | Ward et al. | 119/171 |
| 6,287,550 B1 | 9/2001 | Trinh et al. | 424/76.6 |
| 6,543,385 B2 * | 4/2003 | Raymond et al. | 119/171 |

FOREIGN PATENT DOCUMENTS

| | | |
|---|---|---|
| JP | 04180592 | 6/1992 |
| JP | 08070725 | 3/1996 |
| JP | 10026151 | 1/1998 |
| JP | 10-26151 | 8/1999 |
| JP | 11276004 | 10/1999 |
| WO | WO98/27809 | 7/1998 |

* cited by examiner

SILICA GEL BASED ANIMAL LITTER

FIELD OF THE INVENTION

The present invention relates generally to absorbent litters for pets. More particularly, the present invention relates to a silica gel based litter composition that efficiently absorbs urine without permeation to the bottom of the litter container.

BACKGROUND OF THE INVENTION

Domestic, house-broken animals, particularly cats, are typically trained to urinate and defecate in a specially provided litter box. Consequently, pet owners, homeowners, veterinarians and laboratory personnel have added absorbent materials to the litter box to collect the urine and feces (i.e., dross). A major problem with the absorbent materials is that after a relatively short period of time, the dross soiled absorbent emits objectionable odors due to the presence of the urine and fecal matter.

In order to reduce or eliminate these objectionable odors, homeowners periodically remove the fecal matter from the absorbent material(s). However, physical removal of the feces does not reduce or eliminate odors caused by the urine absorbed into the absorbent. Therefore, when the odors caused by the absorbed urine become intolerable, the homeowner discards the absorbent material. The homeowner then washes the litter box and refills it with fresh absorbent material. These activities are, however, unpleasant, time-consuming and expensive.

The most commonly used absorbent materials are inexpensive clays, such as calcined clays, that are safe and non-irritating to the animals. As is well known in the art, clays generally absorb relatively substantial amounts of liquids.

Other porous absorbent materials, that are used alone or in combination, include straw, sawdust, wood chips, wood shavings, porous polymeric beads, shredded paper, bark, cloth, ground corn husks, cellulose, water-insoluble inorganic salts, such as calcium sulfate, and sand. Although the noted absorbent materials have the advantage of low cost, each suffers from the disadvantage of merely absorbing and retaining the liquid dross within its porous matrices, or, in the case of sand, absorbing the liquid dross on its surface.

More recently, litter compositions having bentonite clay particles have been employed to address the malodor problem arising from retained urine and fecal matter. As is well known in the art, bentonite is a water-swellable clay which, upon contact with liquid (or moist) dross, readily agglomerates with other moistened bentonite clay particles. The moist animal waste is thus isolated by the agglomeration of the moist clay particles and can be readily removed from the litter. Illustrative bentonite based litter compositions are disclosed in U.S. Pat. Nos. 5,503,111, 5,386,803, 5,317,990, 5,129,365 and U.S. Reissue Pat. No. RE 33, 983.

Various other litter compositions and techniques have also been employed to address the malodor problem arising from the presence of urine and fecal matter, particularly urine. For example, U.S. Pat. Nos. 3,059,615, 3,029,783, 4,306,516 and 3,892,846 teach the use of fairly strong inorganic or organic acids to control ammonia formation and, hence, offensive odors.

Still others have sought to decrease odors by employing a non-clay substrate to improve the absorption rate of the litter composition. Illustrative is the alfalfa-based litter composition disclosed in U.S. Pat. No. 3,923,005. However, the simple change of substrate limits the litter composition to the particular substrate's absorptive capacity.

Unlike other prior art attempts, which merely use a clay or absorbent plant material, U.S. Pat. No. 5,970,915 teaches the use of a macroporous silica gel in granular form as the litter substrate. Odor reduction is, however, primarily addressed by applying a film of a disinfectant to the inside surface of the litter box.

A further drawback of the litter composition disclosed in the '915 patent, and each of the aforementioned litter compositions, is the permeation of urine through the litter composition, which accumulates at the bottom of the litter box. After a brief period of time, the accumulated urine decomposes, produces volatile compounds (e.g., ammonia) and, ultimately, emits offensive odors.

It is therefore an object of the present invention to provide an improved litter composition that overcomes the aforementioned drawbacks and disadvantages that are often associated with conventional litter compositions.

It is another object of the invention to provide a low cost, litter composition that substantially reduces the emanation of offensive odors from urine and fecal matter disposed therein.

It is another object of the invention to provide a litter composition that readily agglomerates upon contact with moist dross and, hence, facilitates removal of the dross from the composition.

It is yet another object of the invention to provide a litter composition that substantially reduces liquid dross permeation to the bottom of the litter box.

SUMMARY OF THE INVENTION

In accordance with the above objects and those that will be mentioned and will become apparent below, the litter composition in accordance with this invention comprises a substantially particulate silica gel material and a binding agent, the binding agent comprising in the range of approximately 0.01%-40% of the litter composition. In one embodiment of the invention, at least 20%, more preferably, 20%-90% of the silica gel material has a particle size less than approximately 2 mm. In additional embodiments, the litter composition includes at least one of the following additional components: fixing agent, colorant agent, anti-bacterial agent, fragrance and/or supplemental absorbent material.

In a further embodiment of the invention, the litter composition comprises a substantially particulate absorbent substrate and a colorant agent, the colorant agent being disposed on the absorbent substrate in an amount sufficient to substantially resist a color change in the b region of the L,a,b color scale.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Before describing the present invention in detail, it is to be understood that this invention is not limited to particularly exemplified systems or process parameters as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the litter compositions of the invention substantially reduce or eliminate the disadvantages and drawbacks associated with prior art litter compositions. In one embodiment of the invention, the litter composition includes at least one primary absorbent material and a binding agent. In additional embodiments of the invention, the noted litter composition also includes at least one of the following components: supplemental absorbent material, a fixing agent, colorant agent, anti-bacterial agent and/or a fragrance. Each of the noted litter composition components are discussed in detail below.

Figure 1:
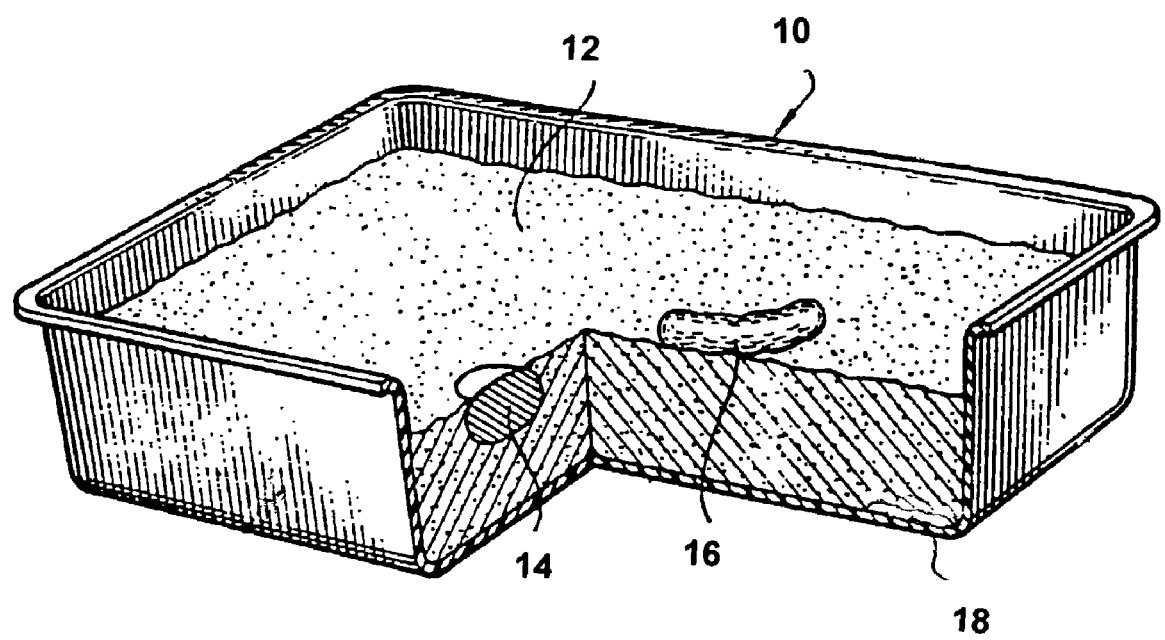
FIG. 1 is a partial section, perspective view of a prior art litter box containing a litter composition.

Referring first to FIG. 1, there is shown a typical litter box 10 having a litter composition 12 therein. As discussed in detail above, conventional litter compositions, such as the composition 12 illustrated in FIG. 1, are generally effective for isolating urine 14 and fecal matter 16 proximate the surface. However, in contrast to the litter compositions of the invention, the conventional litter compositions are generally not effective in eliminating the accumulation of urine at the bottom of the litter box 10 (designated generally 18).

Primary Absorbent Material

A key component of the litter compositions of the invention is the primary absorbent material (or substrate). Preferably, the primary absorbent material comprises silica gel or amorphous silica, which is preferably formed by acid precipitation of sodium silicate followed by drying. This material is also referred to as silica acid or hydrated silica. In a preferred embodiment, the primary absorbent material comprises silica gel.

As will be appreciated by one having ordinary skill in the art, typical silica gel material has a bulk density of 400-600 g/l, pore volume of approximately 50-250 angstroms and an absorption capacity of approximately 50%-90%. The material is also white to semi-translucent and may be either granular or bead shaped.

In one embodiment of the invention, greater than approximately 20%, more preferably, 20%-90% of the silica gel particles exhibit a particle size less than approximately 2 mm. Even more preferably, 10%-90% of the silica gel particles exhibit a particle size less than approximately 1 mm. Most preferably, 30%-70% of the silica gel particles exhibit a particle size less than 1 mm.

In a further aspect of the invention, the silica gel particles have a mean particle size less than approximately 2 mm, more preferably, less than 1 mm. Even more preferably, the silica gel particles have a mean particle size in the range of approximately 0.2-1 mm.

Binding Agent

As indicated above, the litter compositions of the invention also include at least one binding agent to induce or facilitate agglomeration. Preferably, the binding agent or agents include (i) natural polymers and synthetic derivatives thereof, including, but not limited to, lignins, gums, starches and polysaccharides, such as lignin sulfonate, carboxymethylcellulose, hydroxyethylcellulose, hydroxypropylcellulose, ethylhydroxyethyl cellulose, methylhydroxypropylcellulose, guar gum, alginates, starch, xanthan gum, gum acacia, and gum Arabic, (ii) synthetic polymers, including, but not limited to, polyvinylpyrrolidone, polyethylene glycol, polyethyleneoxide, acrylate polymers and copolymers, acrylic emulsions, polyvinyl alcohol, polyvinyl acetate, polyvinyl pyrrolidine, polyacrylic acid, latexes (e.g., neoprene latex), superabsorbent polymers (e.g., cross-linked polyacrylates), flocculating agents (e.g., polycarboxylates), and fluorinated polymers (e.g., polytetrafluoroethylene), and (iii) inorganic agglomerating agents, including, but not limited to, soluble silicates and phosphates, including pyrophosphates and aluminates.

In a preferred embodiment of the invention, the binding agent comprises a polysaccharide gum, more preferably, a galactomannan gum. As is well known in the art, a galactomannan gum is a carbohydrate polymer containing D-galactose and D-mannose units, or other derivatives of such a polymer.

Galactomannan gums include guar gum, which is the pulverized endosperm of the seed of either of two leguminous plants (*Cyamposis tetragonalobus* and psoraloids), locust bean gum, which is found in the endosperm of the seeds of the carob tree (*Ceratonia siliqua*), and carob gum.

In a further embodiment, the binding agent comprises a cellulose ether. A preferred cellulose ester is commercially available under the trade name METHOCEL™.

Preferably, the binding agent(s) comprise approximately 0.01%-40% of the litter composition, more preferably, at least approximately 1% of the litter composition. Even more preferably, the binding agent(s) comprise approximately 5%-20% of the litter composition.

Fixing Agent

In a further embodiment of the invention, the litter composition of the invention includes at least one fixing agent to control the segregation of small particles and, hence, undesirable dust. According to the invention, the fixing agent facilitates coating of the moisture activated binding agent to the litter particles. The amount of the fixing agent present in the litter composition varies with the amount of binding agent present.

Preferably, the fixing agent is water-soluble and comprises up to approximately 6%, by weight, of the litter composition. More preferably, the fixing agent comprises less than approximately 2%, by weight, of the litter composition.

Preferred fixing agents include wheat paste, rice paste, starch, mucilage, fluoropolymer emulsions, water soluble acrylic polymers and soluble vinyl polymers, such as polyvinyl acetate. Particularly preferred fixing agents include acrylic emulsions, neoprene latex and polyethylene glycol, having an average molecular weight of at least about 2000, more preferably, at least about 3000.

Colorant Agent

In yet another embodiment, the litter composition includes at least one colorant agent. According to the invention, the colorant agent includes dyes, including, but not limited to, direct dyes, vat dyes, sulfur dyes, acid dyes, mordant acid dyes, premetalized acid dyes, basic dyes, dispersed dyes, reactive dyes, azo dyes, phthalocyanine dyes, anthraquinone dye, quinoline dyes, monoazo, disazo and polyazo dyes. Preferred dyes include anthraquinone, quinoline and monoazo dyes. Especially preferred dyes are polymeric dyes (e.g., dyes that are covalently bonded to polymers). The colorant agent can also include a pigment (e.g., phthalo pigments).

Preferably, the colorant agent comprises up to approximately 5% of the litter composition, more preferably, 0.001%-1% of the litter composition. Even more preferably, the colorant agent comprises approximately 0.001%-0.01% of the litter composition.

In a further aspect of the invention, the colorant agent is disposed on at least 10% of the primary absorbent material (e.g., silica gel). More preferably, the colorant agent is disposed on at least 20% of the primary absorbent material.

According to the invention, the dyes and pigments may be any color, even yellow. An effective amount of dye or pigment is that which is perceived by consumers to be preferred over uncolored litter. One well established method of assessing the effectiveness of the dye or pigment is by measuring the litter composition resistance to color changes in the b region (or coordinate) of the L,a,b color scale when soiled by animal urine. As is well known in the art, the L,a,b color scale is a uniform color system developed by Hunterlab to represent colors. See, e.g., Kirk-Othmer, $Encyclopedia\ of\ Chemical\ Technology$, $4^{th}$ Ed., Vol. 11, p. 238 (1994); R. S. Hunter, $Instruments\ and\ Test\ Methods\ for\ Control\ of\ Whiteness\ in\ Textile\ Mills$, Proceedings of the American Association of Textile Chemists and Colorists, 1966 National Technical Conference (1966).

As discussed in detail below, Applicants have found that the colored litter compositions of the invention substantially resist color changes in the b region of the L,a,b color scale when soiled with animal urine. More particularly, the color change in the b region is less than 10 units.

Anti-Bacterial Agent

As indicated above, the litter compositions of the invention can further include at least one anti-bacterial agent (or antimicrobial and/or urease inhibitor) as an odor control agent. One class of anti-bacterial or odor control agents is transition metal ions and their soluble salts. Preferred transition metals include silver, copper, zinc, ferric and aluminum salts. More preferably, the transition metal comprises zinc.

Other odor control agents include sulfuric acid, phosphoric acid, hydroxamic acid, thiourea, iodophores, 3-isothiazolones, salts of phytic acid, plant extracts, pine oil, naturally occurring acids and antimicrobials, such as quaternary ammonium compounds, organic sulfur compounds, halogenated phenols, hexachlorophene, 2,4,4'-trichloro-2'-hydroxydiphenyl ether, trichlorocarbanalide, 2,4-dichloro-meta-xylenol, 3,4,5-tribromosalicylanalide, 3,5,3',4'-tetrachlorosalicylanalide, and mixtures thereof.

Additional odor control (or odor-absorbing) agents include carbonates, bicarbonates, cyclodextrins, zeolites, activated carbon, kieselguhr, chelating agents, chitin and pH buffered materials, such as carboxylic acids and the like. Preferred agents are those which absorb primary amines.

In a further aspect of the invention, enzymes are employed as odor control agents. The enzymes include ureases and proteases, such as pepsin, tripsin, ficin, bromelin, papain, rennin, and mixtures thereof.

A particularly preferred class of odor control agents is boron compounds, including borax pentahydrate, borax decahydrate and boric acid. Polyborate, tetraboric acid, sodium metaborate and other forms of boron are also appropriate alternative materials. Other boron-based compounds potentially suitable for use are disclosed in Kirk-Othmer, $Encyclopedia\ of\ Chemical\ Technology$, $3^{rd}$ Ed., Vol. 4, pp. 67-109 (1978), which is incorporated by reference herein.

Applicants have found that borax provides multiple benefits in odor control by: (1) acting as a urease inhibitor, which controls odors by preventing enzymatic breakdown of urea; and (2) exhibiting bacteriostatic properties, which appear to help control odor by controlling the growth of bacteria which are responsible for production of the urease enzymes. Applicants have further found that an odor controlling effective amount comprises at least about 0.02% equivalent boron, more preferably, greater than 0.03% equivalent boron.

Preferably, the anti-bacterial agent comprises approximately 0.02% -1%, by weight, of the litter composition. More preferably, the anti-bacterial agent comprises approximately 0.02%-0.75%, by weight, of the litter composition. Even more preferably, the anti-bacterial agent comprises approximately 0.02%-0.15%, by weight, of the litter composition. As will be appreciated by one skilled in the art, the compositional levels can be adjusted to ensure effective odor control and cost effectiveness.

Fragrance

In a further aspect of the invention, the litter composition includes one or more fragrances to provide a freshness or deodorizing impression to humans or serve as an attractant fragrance to animals. Although some "free" fragrance can be present, it is preferably that at least a major part of the fragrance (or perfume) be contained or encapsulated in a carrier to prevent premature loss to the atmosphere, as well as to avoid a strong fragrance odor which can be uncomfortable to the animals. According to the invention, the encapsulation can be in the form of molecular encapsulation, such as the inclusion complex with cyclodextrin, coacevate microencapsulation wherein the fragrance droplet is enclosed in a solid wall material, or "cellular matrix" encapsulation wherein solid particles containing perfume droplets stably held in the cells. Fragrance can also be more crudely embedded in a matrix, such as a starch or sugar matrix.

The encapsulated fragrance can be released either by moisture activation and/or a pressure activation mechanism. Moisture-activated microcapsules release fragrance upon being wetted, e.g., by the animal urine. Pressure-activated microcapsules release fragrance when the shell wall is broken by, e.g., the scratching or stepping of the animals on the litter. Some microcapsules can be activated both by moisture and pressure.

The animal litter of the present invention can also contain pro-fragrances. A pro-fragrance is a normally nonvolatile molecule which consists of a volatile fragrance ingredient covalently bonded to another moiety by a labile covalent bond. In use, the pro-fragrance is decomposed to release the volatile fragrance ingredient. Preferred pro-fragrances include complexes of bisulfite, with fragrance ingredients having an aldehyde or ketone functional groups, and esters of phosphoric acids, and sulfuric acids with fragrance ingredients having a hydroxyl group.

Preferably, the fragrance comprises approximately 0.001%-1%, by weight, of the litter composition, more preferably, approximately 0.005%-0.5%, by weight, of the litter composition. Even more preferably, the fragrance comprises approximately 0.01%-0.2%, by weight, of the litter composition.

Supplemental Absorbent Material

As indicated above, the litter composition of the invention can further include one or more supplemental absorbent materials. Preferred supplemental absorbent materials include (i) minerals, such as Georgia White clay, sepiolite, zeolite, calcite, dolomite, slate, pumice, tobermite, marls, attapulgite, bentonite, kaolinite, halloysite, montmorillonite, smectite, vermiculite, hectorite, diatomaceous earth, Fuller's earth, fossilized plant materials, expanded perlites, gypsum and other similar minerals and (ii) other natural and processed materials, such as paper, cellulosic webs, polymeric fibrous webs, wood chips, alfalfa, bark, straw, sand, grain hulls, synthetic foams, recycled materials, and pelletized absorbing litter materials. The supplemental absorbent materials can also comprise mixtures of the noted materials.

According to the invention, the supplemental absorbent agents, if employed, comprise up to approximately 60%, by weight, of the litter composition, more preferably up to approximately 40%, by weight, of the litter composition. Even more preferably, the supplemental absorbent agent(s) comprise up to approximately 30%, by weight, of the litter composition.

The following examples illustrate the litter compositions of the invention. The examples are for illustrative purposes only and are not meant to limit the scope of the invention in any way.

EXAMPLES

Various samples of litter compositions of the invention were prepared and investigated to determine the following characteristics: (i) agglomerate or clump strength, (ii) hydraulic conductivity, (iii) urine penetration, (iv) clump aspect ratio, (v) sensory perception and (vi) colorimetry. The results of the investigation are set forth below.

Clump Strength

In addition to odor control, agglomerate or clump strength is a significant performance characteristic of a silica gel based litter composition. To investigate clump strength of the litter composition(s), clumps were produced using actual feline urine. The clumps were first weighed, shaken on a coarse screen, and measured for weight loss. Clump strength was thus the percentage of the remaining litter after shaking of the clump; a clump strength of 100% indicating that none of the material fell away from the urine clump, and a clump strength of 0% indicating that the clump fell completely apart.

Although a litter composition could be made of silica gel alone, it would not have the beneficial properties of "clumping" that the consumer desires to help remove the waste from the litter. A moisture-activated binder could be added through simple addition, but, the binder would have a tendency to segregate to the bottom of the box and lower the strength of the litter clumps. However, the addition of a fixing agent, which attaches the moisture-activated binder to the silica gel particles, creates an improved litter composition that retains its ability to form strong clumps even when agitated.

Referring now to Tables IA and IB, there is shown the clump strength of several litter compositions of the invention, wherein "SG" denotes silica gel, "GG" denotes guar gum, and "FA" denotes fixing agent. Each of the compositions was tested "as-made" and then shaken for 30 seconds to simulate conditions of segregation.

In Samples 1 and 2, the silica gel alone provided virtually no clump strength, either before or after shaking. Further, as expected, the clumps fell apart when tested.

In Samples 3 and 4, the silica gel and guar gum compositions provided adequate clump strength of 87% and 65%, respectively. However, shaking caused the guar to segregate to the bottom of each composition. The resulting compositions thus exhibited post-shaking clump strength of 14% and 8%, respectively.

As illustrated by Sample 5, the litter composition can be substantially improved by adding a fixing agent. In the noted sample, the clump strength started at 93% and maintained a strong 90% strength even after shaking.

Referring to Sample 6, the clump strength was further improved by decreasing the particle size of the silica gel. The clump strength also remained high even after shaking.

TABLE IA

|  | Sample 1 | Sample 2 | Sample 3 |
| --- | --- | --- | --- |
| Composition | 1-2 mm SG | 2-8 mm SG | 1-2 mm SG 1.5% GG |
| Clump strength* (blended) | 0% | 0% | 87% |
| Clump strength* after shaking | 0% | 0% | 14% |

*Measured as the remaining portion of actual feline litter clumps after agitation on a 0 5 in. screen for 5 sec.

TABLE IB

|  | Sample 4 | Sample 5 | Sample 6 |
| --- | --- | --- | --- |
| Composition | 2-8 mm SG 1.5% GG | 1-2 mm SG 1.5% GG 0.66% FA | 0.15-2 mm SG 1.5% GG 0.66% FA |
| Clump strength* (blended) | 65% | 93% | 94% |
| Clump strength* after shaking | 8% | 90% | 92% |

Hydraulic Conductivity

As is well known in the art, hydraulic conductivity, which reflects the ability of a porous medium to transmit water through its interconnected voids, is one of the most important characteristics of water absorbing substrates. Hydraulic conductivity can thus be defined as the ease with which liquids pass through a substrate, and is dependent largely on the size and shape of the void spaces between individual particles in the substrate.

It is further well known that Darcy's law describes the relationship between the movement of a liquid through a porous substrate, and the hydraulic head difference in the water at the top and bottom of the substrate, i.e., $$Q = KA(h_a - h_b)/L \qquad \text{Eq.1}$$

wherein:
Q=Flow rate
K=Hydraulic Conductivity
A=Cross Sectional Area
L=Length of the Sediment
ha−hb=Hydraulic Head By utilizing a K value (hydraulic conductivity) determination, particle size distribution of the litter substrate can be optimized to reduce permeability, making the urine path through the litter more tortuous and reducing the depth of urine penetration. This makes it more difficult for the urine to reach the bottom of the litter box and minimizes accumulation of urine and the problems associated with the accumulation urine mentioned above.

As will be appreciated by one having ordinary skill in the art, silica gels of different particle size distributions will give different values for permeability or hydraulic conductivity (K), following ASTM method D2434-68 (2000). It has however surprisingly been found that particle size distributions of the litter compositions of the invention that exhibit hydraulic conductivities below 0.25 cm/s can substantially decrease urine penetration in a standard litter box.

Referring to Table II, there is shown the effect of particle size distribution on hydraulic conductivity. It can be seen that the addition of smaller particle size silica gel to the litter composition inhibits flow and decreases the hydraulic conductivity compared to larger particle size litter compositions.

Figure 2:
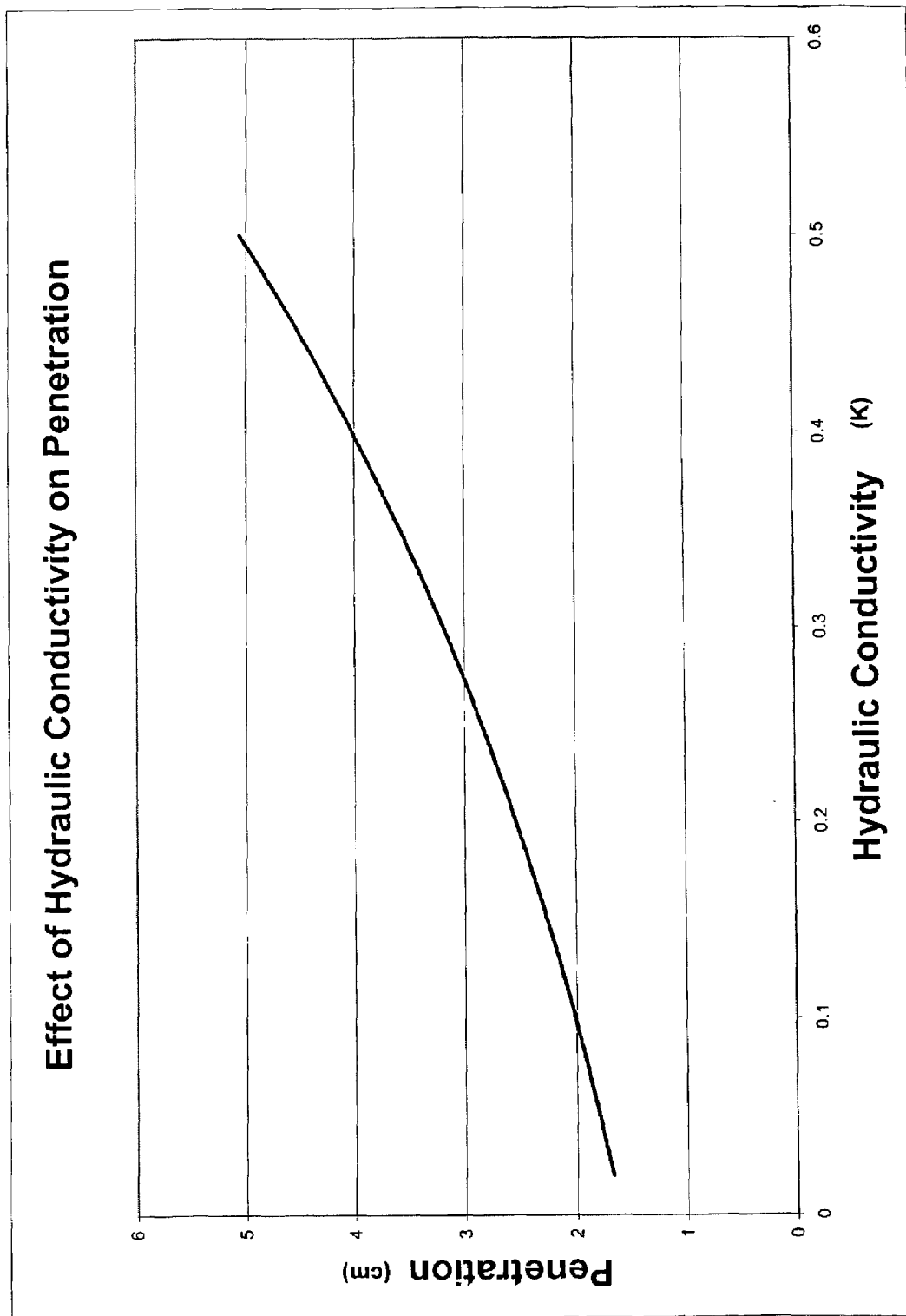
FIG. 2 is a graph illustrating the effect of hydraulic conductivity on urine penetration.

Referring now to FIG. 2, there is shown the effect of hydraulic conductivity (K) on penetration of urine. As illustrated in FIG. 2, penetration generally decreases as the K value decreases. Thus, a low K value allows the consumer to use less litter while preventing penetration.

Penetration and Clump Aspect Ratio

Penetration is determined by measuring height of the clump formed in the formula using feline urine. Another way of determining the penetration is by measuring the clump aspect ratio. The aspect ratio is calculated by comparing the maximum width of the clump to the maximum height of the clump. When litter product was made with particle size distributions of silica gel with low hydraulic conductivity, clumps looked pancake shaped (high aspect ratio) rather than egg shaped (low aspect ratio). These pancake shaped clumps are surprisingly easier for pet owners to dispose. As illustrated in Table II, particle size distributions of the litter compositions of the invention provide more favorable penetration values and clump aspect ratios.

TABLE II

|  | Base | Sample 7 | Sample 8 | Sample 9 | Sample 10 |
| --- | --- | --- | --- | --- | --- |
| 1-2 mm | >93% | 50% | 40% | 35% | 35% |
| 0.2-1.5 mm |  | 50% | 50% | 50% | 45% |
| 0.15-0.6 mm |  |  | 10% | 15% | 20% |
| Hydraulic conductivity (cm/s) | 0.25 | 0.125 | 0.05 | 0.025 | 0.02 |
| Urine penetrates more than 2.54 cm (1 inch)* | Yes | No | No | No | No |
| Clump Aspect Ratio (Width to Height) | 1.8 | 2.0 | 3.3 | 3.8 | 3.1 |

*Urine penetration determined by lab testing with 10 ml of feline urine

Sensory Testing

Referring to Table III, there is shown the effect of coloration on the perception of litter. Cat litter users were asked to judge samples of litter on a 60 point scale from Clean (60) to Dirty (0). Samples were prepared with increasing levels of blue coloration on the silica, and were dosed with urine to represent used litter. The levels of urine in each sample were equal, but the panelist's perception of how clean the litter was improved with increasing coloration.

TABLE III

| Level of Colorant | Clean Perception |
| --- | --- |
| 5% Blue colored particles | 21 |
| 100% colored silica gel with |  |
| (a) 0.000375% Acid Blue 9 | 24 |
| (b) 0.00125% Acid Blue 9 | 32 |
| (c) 0.00050% Acid Blue 9/0.00075% Wool Violet | 37 |
| (d) 0.025% UMB | 29 |
| (e) 0.0028% Acid Blue 9 | 40 |

Consumer perception of a negative discoloration is also influenced by the percent of colored particles. Referring to Table IV, there is shown the effect of the percent of colored particles on the perception of yellow.

In the noted investigation, 10 ml of feline urine was pipetted on a silica gel and binding agent litter composition of the invention. The clumps formed on the surface of the litter composition were then judged for the perception of yellow. As illustrated in Table IV, even adding color to 50% of the particles substantially reduced the yellow perception of the litter composition after one simulated usage.

TABLE IV

| Percent of colored particles | Perception of yellow color (0-60, where 60 is yellow) |
| --- | --- |
| 0% | 28 |
| 50% | 24 |
| 100% | 19 |

Colorimetric Testing

Preferred colorants can also be determined by their ability to resist color change in the b region of the L,a,b color scale. As indicated above, the L,a,b scale is an industry standard used for the measurement of color. It is comprised of 3 perpendicular color axes (L, a and b) that define a three-dimensional color space.

A litter composition sample was prepared by dosing 10 ml of cat urine onto one area of the sample. The soiled sample was placed in a plastic petri dish and covered to compress the sample. The sample was then read on a Hunter colorimeter to measure the change in b value compared to a comparable litter composition sample treated with 10 ml of water.

Referring to Table V, there is shown the effect of various percentages of colored particles on the ability of the litter composition to hide yellow color by minimizing shifts in a positive b direction. The b axis of the scale measures yellow to blue.

As illustrated in Table V, when soiled with urine, uncolored silica gel shifts 16 units on the b scale in the direction of the color yellow. However, soiled 75% blue silica gel only shifts 1 unit on the b scale compared to uncolored silica, which evidences its ability to hide the perception of a yellow color. Even a litter composition containing 25% colored silica gel reduces the shift in the b scale to 5 units.

TABLE V

|  | Sample | Sample | Sample | Sample | Sample |
|---|---|---|---|---|---|
| Percentage of Colored Speckles in Silica Gel (blue) | 0% | 5% | 25% | 50% | 75% |
| Yellow shift when soiled (b scale) | 16.0 | 9.1 | 5.0 | 2.5 | 0.7 |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A particulate litter composition, comprising:
    a substantially particulate silica gel material; and
    at least one binding agent adhered to said silica gel material with a substantially water soluble fixing agent to form a scoopable particulate litter composition;
    wherein said binding agent comprises approximately 0.01%-40% of said litter composition and said binding agent facilitates agglomeration of said silica gel material when wetted such that the portion of silica gel material that agglomerates is removable as a clump from the remaining litter composition.

2. The litter composition of claim 1, wherein at least approximately 20% -90% of said silica gel material has a particle size less than approximately 2 mm.

3. The litter composition of claim 2, wherein approximately 10%-90% of said silica gel material has a particle size less than approximately 1 mm.

4. The litter composition of claim 3, wherein 30%-70% of said silica gel material has a particle size less than 1 mm.

5. The litter composition of claim 1, wherein said silica gel material has a mean particle size less than approximately 2 mm.

6. The litter composition of claim 5, wherein said silica gel material has a mean particle size less than 1 mm.

7. The litter composition of claim 6, wherein said silica gel material has a mean particle size in the range of approximately 0.2-1 mm.

8. The litter composition of claim 1, wherein said silica gel material comprises amorphous silica.

9. The litter composition of claim 1, wherein said binding agent comprises at least approximately 1% of said litter composition.

10. The litter composition of claim 9, wherein said binding agent comprises in the range of approximately 5% -20% of said litter composition.

11. The litter composition of claim 1, wherein said binding agent is selected from the group consisting of natural polymers and synthetic derivatives of natural polymers.

12. The litter composition of claim 11, wherein said binding agent is selected from the group consisting of lignins, gums, starches and polysaccharides.

13. The litter composition of claim 12, wherein said binding agent is selected from the group consisting of lignin sulfonate, carb,oxymethylcellulose, hydroxyethylcellulose, hydroxypropylcellulose, ethylhydroxyethyl cellulose, methylhydroxyethyl cellulose, methyhydroxypropylcellulose, guar gum, alginates, xanthan gum, gum acicia and gum Arabic.

14. The lifter composition of claim 1, wherein said binding agent comprises a synthetic polymer selected from the group consisting of polyvinylpyrrolidone, polyethylene glycol, polyethyleneoxide, acrylate polymers and copolymers, acrylic emulsions, polyvinyl alcohol, polyvinyl acetate, polyvinyl pyrrolidine, polyacrylic acid, latexes, superabsorbent polymers, flocculating agents and fluorinated polymers.

15. The litter composition of claim 1, wherein said binding agent comprises an inorganic agglomerating agent selected from the group consisting of soluble silicates and phosphates.

16. The litter composition of claim 1, wherein said binding agent comprises a galactomannan gum.

17. The litter composition of claim 1, wherein said binding agent comprises a cellulose ester.

18. The litter composition of claim 1, wherein said fixing agent comprises up to approximately 6%, by weight, of said litter composition.

19. The litter composition of claim 18, wherein said fixing agent comprises less than approximately 2%, by weight, of said litter composition.

20. The litter composition of claim 1, wherein said fixing agent is selected from the group consisting of wheat paste, rice paste, starch and mucilage.

21. The litter composition of claim 1, wherein said fixing agent is selected from the group consisting of fluoropolymer emulsions, water soluble acrylic polymers and soluble vinyl polymers.

22. The litter composition of claim 1, wherein said litter composition includes a colorant agent.

23. The litter composition of claim 22, wherein said colorant agent comprises up to approximately 5% of said litter composition.

24. The litter composition of claim 23, wherein said colorant agent comprises in the range of approximately 0.001% -1% of said litter composition.

25. The litter composition of claim 24, wherein said colorant agent comprises in the range of approximately 0.001% -0.01% of said litter composition.

26. The litter composition of claim 22, wherein said colorant agent is disposed on at least 20% of said silica gel material.

27. The litter composition of claim 26, wherein said colorant agent is disposed on at least 10% of said silica gel material.

28. The litter composition of claim 22, wherein said colorant agent comprises a dye selected from the group consisting of direct dyes, vat dyes, sulfur dyes, acid dyes, mordant acid dyes, premetalized acid dyes, basic dyes, dispersed dyes, reactive dyes, azo dyes, phthalocyanine dyes, anthraquinone dyes, polymeric dyes, quinoline dyes, monoazo, disazo and polyazo dyes.

29. The litter composition of claim 22, wherein said colorant agent comprises a pigment.

30. The litter composition of claim 1, wherein said litter composition includes anti-bacterial agent.

31. The litter composition of claim 30, wherein said anti-bacterial agent comprises in the range of approximately 0.2% -0.75, by weight, of said litter composition.

32. The litter composition of claim 31, wherein said anti-bacterial agent comprises in the range of approximately 0.02-0.15%, by weight, of said litter composition.

33. The litter composition of claim 30, wherein said anti-bacterial agent comprises a transition metal ion.

34. The litter composition of claim 30, wherein said anti-bacterial agent comprises a material selected from the group consisting of phosphoric acid, hydroxamic avid, thiourea, iodophores, 3-isothiazolones, salts of phytic acid, plant extracts, pine oil, naturally occurring acids and antimicrobials, wherein said antimicrobial is selected from the group consisting of quaternary ammonium compounds, organic sulfur compounds, halogenated phenols, hexachlorophene, 2,4,4'-trichloro-2'-hydroxydiphenyl ether, trichiorocarbanalide, 2,4-dichloro-meta-xylenol, 3,4,5-tribromosalicylanalide, 3,5,3',4'-tetrachlorosalicylanalide, and mixtures thereof.

35. The litter composition of claim 30, wherein said anti-bacterial agent is selected from the group consisting of carbonates, bicarbonates, cyclodextrins. zeolites, activated carbon, kieselguhr, chelating agents, chitin and pH buffered materials.

36. The litter composition of claim 30, wherein said anti-bacterial agent comprises an enzyme.

37. The litter composition of claim 36, wherein said enzyme is selected from the group consisting of pepsin, tripsin, ficin, bromelin, papain, rennin, and mixtures thereof.

38. The litter composition of claim 30, wherein said anti-bacterial agent comprises a boron compound.

39. The litter composition of claim 38, wherein said boron compound is selected from the group consisting of borax pentahydrate, borax decahydrate, boric acid, polyborate, tetraboric acid, sodium metaborate, and mixtures thereof.

40. The litter composition of claim 1, wherein said litter composition includes at least one fragrance.

41. The litter composition of claim 40, wherein said fragrance is substantially encapsulated.

42. The litter composition of claim 40, wherein said fragrance comprises approximately 0.001% -1%, by weight, of said litter composition.

43. The litter composition of claim 42, wherein said fragrance comprises approximately 0.005% -0.5%, by weight, of said litter composition.

44. The litter composition of claim 43, wherein said fragrance comprises approximately 0.01% -0.2%, by weight, of said litter composition.

45. The lifter composition of claim 1, wherein said litter composition includes a supplemental absorbent material.

46. The litter composition of claim 45, wherein said supplemental absorbent material comprises up to approximately 60%, by weight, of said lifter composition.

47. The litter composition of claim 46, wherein said supplemental absorbent material comprises up to approximately 40%, by weight, of said litter composition.

48. The litter composition of claim 47, wherein said supplemental absorbent material comprises up to approximately 30%, by weight, of said litter composition.

49. The litter composition of claim 45, wherein said supplemental absorbent material comprises a mineral selected from the group consisting of Georgia White clay, sepiolite, zeolite, calcite, dolomite, slate, pumice, tobermite, marls, attapulgite, bentonite, kaolinite, halloysite, montmorillonite, smectite, vermiculite, hectorite, diatomaceous earth, Fuller's earth, fossilized plant materials, expanded perlites and gypsum.

50. The litter composition of claim 49, wherein said supplemental absorbent material comprises a material selected from the group consisting of paper, cellulosic webs, polymeric, fibrous webs, wood chips, alfalfa, bark, straw, sand, grain hulls and syntetic foams.

51. A particulate litter composition, comprising:
a substantially particulate silica gel material, at least 20% -90% of said silica gel material having a particle size less than approximately 2 mm; and
at least one binding agent adhered to said silica gel material with a substantially water soluble fixing agent to form a scoopable particulate litter composition; wherein said binding agent comprises approximately 0.01%-40% of said litter composition and said binding agent facilitates agglomeration of said silica gel material when wetted such that the portion of silica gel material that agglomerates is removable as a clump from the remaining litter composition.

52. A particulate litter composition, comprising:
a substantially particulate silica gel material; and
at least one binding agent adhered to said silica gel material with a substantially water soluble fixing agent to form a scoopable particulate litter composition; wherein said binding agent facilitates agglomeration of said silica gel material when wetted such that the portion of silica gel material that agglomerates is removable as a clump from the remaining litter composition, said scoopable particulate litter composition having a hydraulic conductivity less than approximately 0.25 cm/s.

53. A particulate litter composition, comprising:
a substantially particulate silica gel material, at least 20% -90% of said silica gel material having a particle size less than approximately 2 mm; at least one binding agent adhered to said silica gel material with a substantially water soluble fixing agent to form a scoopable particulate litter composition; wherein said binding agent comprises approximately 0.01%-40% of said litter composition and said binding agent facilitates agglomeration of said silica gel material when wetted such that the portion of silica gel material that agglomerates is removable as a clump from the remaining litter composition, said fixing agent comprising up to approximately 6%, by weight, of said litter composition.

54. A particulate litter composition, comprising:
a substantially particulate silica gel material, at least 20% -90% of said silica gel material having a particle size less than approximately 2 mm;
at least one binding agent adhered to said silica gel material with a substantially water soluble fixing agent to form a scoopable particulate litter composition; wherein said binding agent comprises approximately 0.0%-40% of said litter composition and said binding agent facilitates agglomeration of said silica gel material when wetted such that the portion of silica gel material that agglomerates is removable as a clump from the remaining litter composition, said fixing agent comprising up to approximately 6%, by weight, of said litter composition; and
a colorant agent, said colorant agent being disposed on at least 10% of said silica gel material.

55. A particulate litter composition, comprising:
a substantially particulate silica gel material, at least 20% -90% of said silica gel material having a particle size less than approximately 2 mm; at least one binding agent adhered to said silica gel material with a substantially water soluble fixing agent to form a scoopable particulate litter composition; wherein said binding agent comprises approximately 0.01%-40% of said litter composition and said binding agent facilitates agglomeration of said silica gel material when wetted such that the portion of silica gel material that agglomerates is removable as a clump from the remaining litter composition, said fixing agent comprising up to approximately 6%, by weight, of said litter composition;

a colorant agent, said colorant agent being disposed on at least 10% of said silica gel material; and an anti-bacterial agent, said anti-bacterial agent comprising approximately 0.02% -0.75%, by weight, of said litter composition.

56. A particulate litter composition, comprising:

a substantially particulate silica gel material;

at least one binding agent adhered to said silica gel material with a substantially water soluble fixing agent to form a scoopable particulate litter composition; wherein said binding agent comprises approximately 0.01%-40% of said litter composition and said binding agent facilitates agglomeration of said silica gel material when wetted such that the portion of silica gel material that agglomerates is removable as a clump from the remaining litter composition; and a colorant agent said colorant agent being disposed on said silica gel material in an amount sufficient to substantially resist a color change in the b region of the L,a,b color scale.

57. A particulate litter composition, comprising:

a substantially particulate silica gel material;

at least one binding agent adhered to said silica gel material with a substantially water soluble fixing agent to form a scoopable particulate litter composition; wherein said binding agent comprises approximately 0.01%-40% of said litter composition and said binding agent facilitates agglomeration of said silica gel material when wetted such that the portion of silica gel material that agglomerates is removable as a clump from the remaining litter composition; and a colorant agent, said litter composition having a color change in the b region of the L,a,b color scale less than approximately 10 units.

58. A particulate litter composition, comprising:

a substantially particulate silica gel material;

at least one binding agent adhered to said silica gel material with a substantially water soluble fixing agent to form a scoopable particulate litter composition; wherein said binding agent comprises approximately 0.01%-40% of said litter composition and said binding agent facilitates agglomeration of said silica gel material when wetted such that the portion of silica gel material that agglomerates is removable as a clump from the remaining litter composition; and a colorant agent said colorant agent being disposed on at least 10% of said silica gel material whereby said litter composition has a color change in the b region of the L,a,b color scale less than approximately 10 units.

* * * * *